Figure 1:
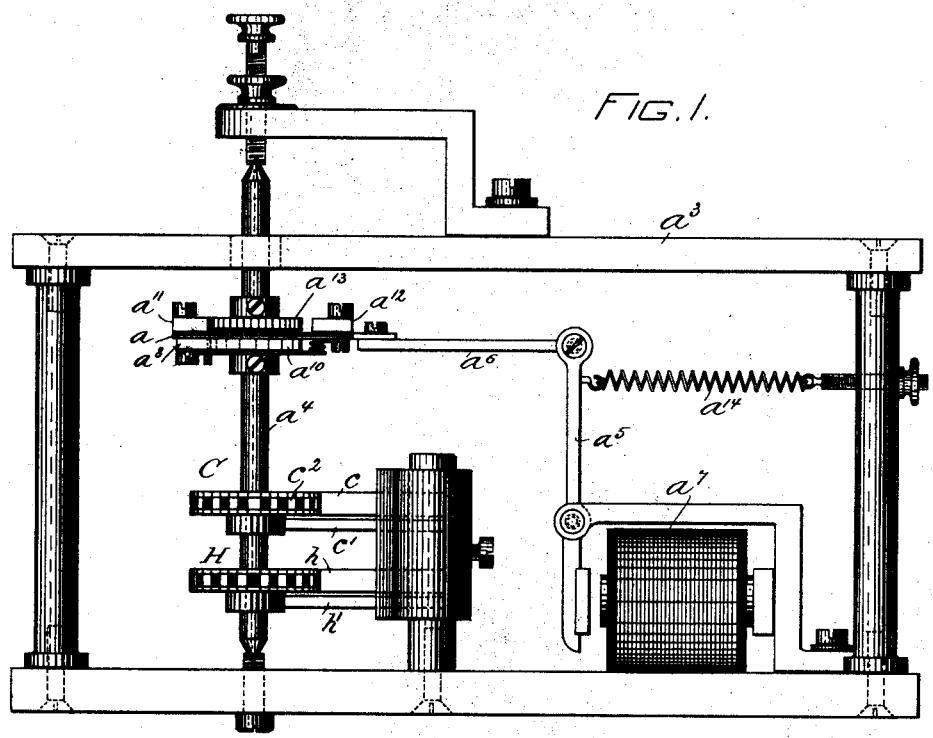

(No Model.) 3 Sheets—Sheet 1.

J. A. DAVIS & R. A. FOWDEN.
ELECTRIC MOTOR.

No. 506,208. Patented Oct. 10, 1893.

WITNESSES:
John W. Achard
Thomas W. Smith

INVENTORS.
Job A. Davis and Robt. A. Fowden
By J. Walter Douglass.
ATT'Y.

(No Model.) 3 Sheets—Sheet 2.

J. A. DAVIS & R. A. FOWDEN.
ELECTRIC MOTOR.

No. 506,208. Patented Oct. 10, 1893.

WITNESSES:
John N. Achard.
Thomas M. Smith.

INVENTORS:
Job A. Davis and Robt. A. Fowden.
By J. Walter Douglass
ATT'Y.

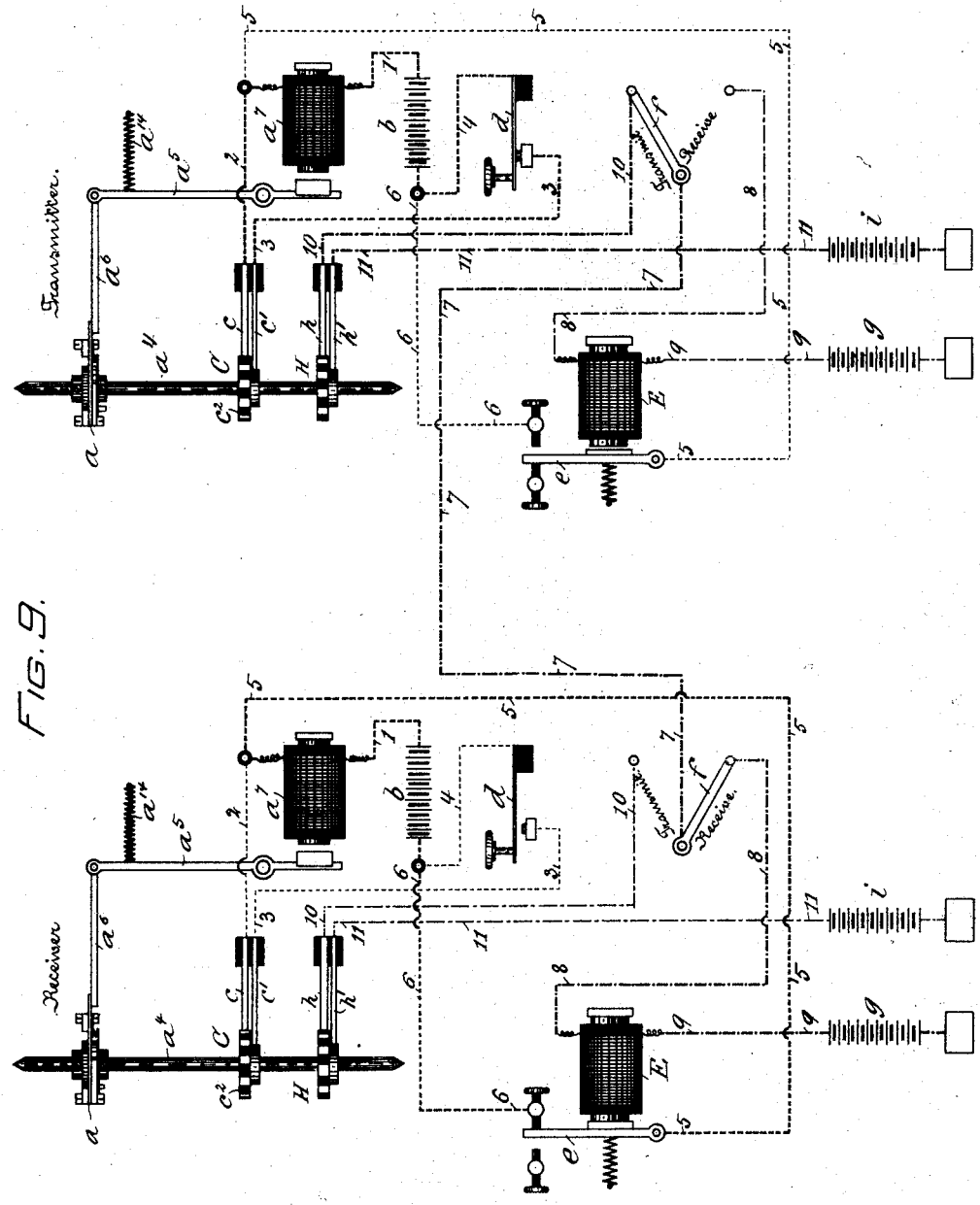

UNITED STATES PATENT OFFICE.

JOB A. DAVIS AND ROBERT A. FOWDEN, OF PHILADELPHIA, PENNSYLVANIA, ASSIGNORS TO THE INTERNATIONAL PRINTING TELEGRAPH COMPANY, OF CAMDEN, NEW JERSEY.

ELECTRIC MOTOR.

SPECIFICATION forming part of Letters Patent No. 506,208, dated October 10, 1893.

Application filed December 23, 1892. Serial No. 456,142. (No model.)

*To all whom it may concern:*

Be it known that we, JOB A. DAVIS and ROBERT A. FOWDEN, both citizens of the United States, and residing at the city of Philadelphia, in the county of Philadelphia and State of Pennsylvania, have jointly invented certain new and useful Improvements in Electric Motors, of which the following is a specification.

Our invention has relation to a step by step electric motor for controlling synchronously telegraphic printers and other instruments.

The principal objects of our invention are first, to provide a simple, durable, efficient and reliable step by step electric motor in which the vibratory motion of a spring controlled armature is transformed into a uniform step by step or intermittent rotary motion; and second, to provide a series of accurate and comparatively inexpensive step by step electric-motors adapted for use in a system of electrical transmission requiring for its successful operation the synchronous step by step movement of a number of independent revoluble members.

Our invention consists of a step by step electric-motor comprising a device or bar responding to electrical impulses or changes in line and provided with pawl-and-ratchet connections for imparting an intermittent or step by step motion to a revoluble member and with detent or pallet-and-escapement connections for equalizing the steps of motion of the revoluble member, and a circuit breaker and closer mounted on said revoluble member and adapted to control the impulses in line.

Our invention further consists of a system of electrical transmission comprising a series of step by step electric-motors provided respectively with a vibratory device or bar responding to electrical changes in line and having pawl-and-ratchet connections for imparting an intermittent or step by step movement to a revoluble-member and having detent or pallet-and-escapement connections for limiting the step by step motion of the revoluble member, and mechanical and electrical devices for positively actuating one of said revoluble members and for causing the same to synchronously operate the other motors; and our invention further consists in the improvements in step by step electric-motors hereinafter fully described and claimed.

In our invention a number of revoluble-members, for example, the shafts of instruments such as are commonly employed in printing telegraphs, are respectively provided with ratchet and with escape wheels that cooperate with vibrating devices or bars provided with pawls and detents, stop-dogs or pallets in such manner that the pawls acting through the instrumentality of the ratchet-wheels impart a motion of rotation to the revoluble-members, and the detents, stop-dogs or pallets acting upon the escape-wheels automatically synchronize the step by step movements imparted by the pawls. The required vibratory motions are imparted to the bars by connecting them respectively with the spring controlled armatures of magnets responding to electrical impulses or changes in line. Of course, the circuits that constitute the means, whereby these magnets are energized and demagnetized may be arranged in many different ways. However, in printing telegraphs and in many other systems of electrical transmission it is important that a number of independent shafts should be driven synchronously with an intermittent or step by step motion, and that means should be provided, whereby all of these shafts may be simultaneously arrested from the transmitting station. These results may be accomplished by the employment of a local battery circuit that traverses the coils of the motor-magnet and then divides into two branches, one of which is controlled at the back-stops of a relay and the other of which is adapted to be closed by a manual-key through an automatic circuit breaker and closer, and of a line circuit that may be closed by a manual-switch through the coils of the relay-magnet or through a second automatic circuit breaker and closer on said shaft. At the transmitter the manual-switch is shifted into position for excluding the coils of the relay-magnet and at the receiver the manual-switch is shifted into position for including the coils of the relay-magnet. When the manual-key is depressed at the transmitting instrument the branch of the local circuit through the local circuit closer and breaker is closed and the motor-magnet is energized and demagnetized, whereby the shaft at the transmitting station is intermittently revolved. The motions of the shaft at the transmitter acting through the instrumentality of the line circuit closer and breaker cause the line circuit to be made and broken through the coils of the relay-magnet at the receiving-station, thus causing the local-circuit at the receiving-station to be made and broken through the coils of its motor-magnet with the result that both shafts are synchronously driven with an intermittent or step by step motion by their complemental motors as long as the manual key is depressed at the transmitting station. As soon as this key is released the local circuit is interrupted through the motor-magnet at the transmitting instrument, so that the shafts of both instruments are arrested. In this connection it may be remarked that when the local circuit is broken by releasing the key at the transmitting instrument, the local circuit is simultaneously broken at the receiving instrument, and the retracting springs of the motor-magnet armatures of both instruments cause the motor-bars to automatically arrest the shafts of both instruments in position for causing the local circuit breakers and closers thereof, to assume a position for permitting the circuits to be again closed through the local circuit breakers and makers upon the depression of a key.

The nature, scope and characteristic features of our invention will be more fully understood from the following description taken in connection with the accompanying drawings, forming part hereof, and in which—

Figure 2:
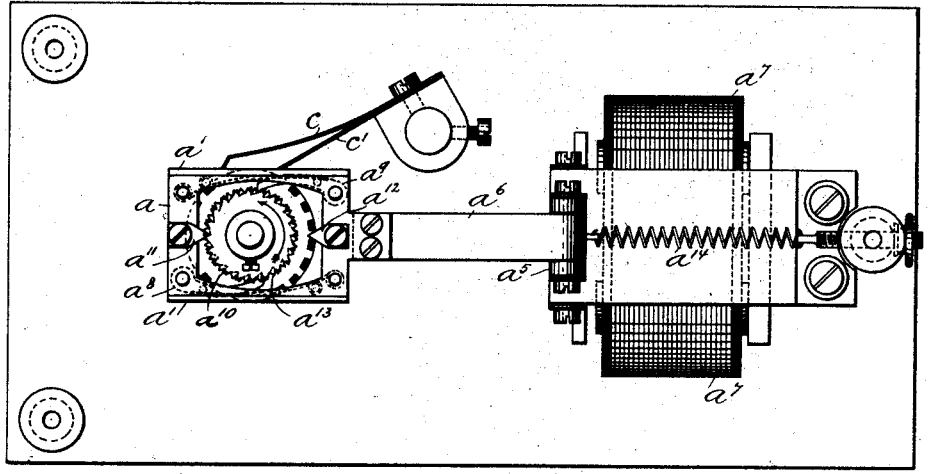
Figure 3:
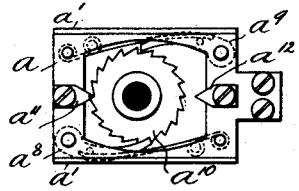
Figure 4:
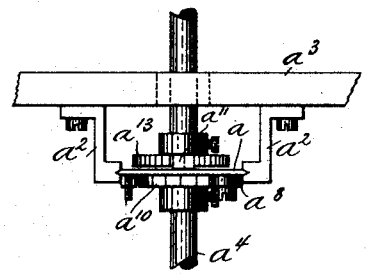
Figure 5:
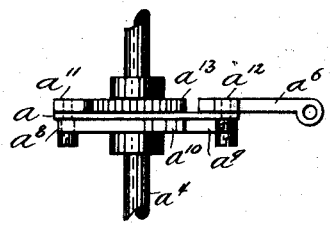
Figure 6:
Figure 7:
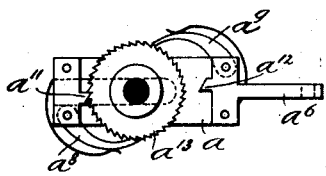
Figure 8:
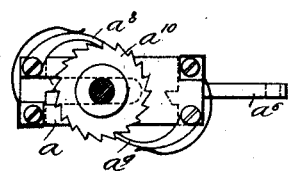

Figure 1, is a side elevational view of portions of a printing telegraph instrument, showing a step by step electric motor embodying features of our invention in application thereto and also showing the guides for the reciprocating bar of the motor removed in order to illustrate certain other parts thereof. Fig. 2, is a top or plan view of the instrument illustrated in Fig. 1, with the top plate thereof removed in order to expose the electric motor embodying features of our invention to view. Fig. 3, is a detached top or plan view of the motor bar illustrated in Figs. 1 and 2, showing its complemental pawl-and-ratchet connections and also the pallets that co-operate with an escapement wheel. Fig. 4, is an end view of the motor bar and its accessories, showing also the motor bar guides. Fig. 5, is a side view of a motor bar embodying a modification of our invention. Fig. 6, is a detached view of the escapement and ratchet wheels shown in Fig. 5. Fig. 7, is a top or plan view of the motor bar illustrated in Fig. 5, showing the pallet and escapement connections. Fig. 8, is a similar view of the under side of the motor bar illustrated in Fig. 5, showing the pawl-and-ratchet connections; and Fig. 9, is a diagrammatic view illustrating one arrangement of circuits for synchronously operating two or more motors embodying features of our invention.

Referring now more particularly to Figs. 1 to 4 inclusive, $a$, is a motor bar provided with beveled edges $a'$, that are afforded a range of movement in suitable ways formed in guides $a^2$, depending from the top plate $a^3$, of the instrument. The center portion of this motor bar $a$, is cut away or slotted in order to accommodate the shaft $a^4$, of the instrument. The other extremity of the motor-bar $a$, is secured to the armature-lever $a^5$, of the motor-magnet $a^7$, by means of a link $a^6$. The spring controlled pawls $a^8$ and $a^9$, pivotally attached to the upper and lower portions of the motor-bar $a$, and the ratchet-wheel $a^{10}$, keyed or otherwise secured to the shaft $a^4$, constitute pawl-and-ratchet connections interposed between the motor-bar $a$, and the shaft $a^4$. The stop-dogs, detents or pallets $a^{11}$ and $a^{12}$, secured opposite the end portions of the slot in the motor-bar $a$, and the escape-wheel $a^{13}$, constitute pallet-and-escapement connections interposed between the motor-bar $a$ and the shaft $a^4$. Whenever the motor-magnet $a^7$, is energized, it pulls up its armature-lever $a^5$, against the force of the retracting spring $a^{14}$, and this motion of the armature lever $a^5$, causes the motor-bar $a$, to be shifted toward the left in said figures, so that the pawl $a^9$, meshes with the ratchet-wheel $a^{10}$, and this shifts the same in the direction indicated by the arrow. The continued movement of the pawl bar $a$, causes the fixed detent, stop-dog or pallet $a^{12}$, to engage the star-shaped teeth of the escape-wheel $a^{13}$, thus accurately adjusting the latter and then locking it to place. When the motor-magnet $a^7$, is demagnetized the armature-lever $a^5$, moving under the influence of the spring $a^{14}$, is shifted into the position illustrated in the drawings. This motion of the armature-lever $a^5$, causes the bar $a$, to be shifted toward the right in said figures, thus causing the pawl $a^8$, to shift the shaft $a^4$, in the direction indicated by the arrow and the detent, stop-dog or pallet $a^{11}$, to adjust and lock it to place. The repeated magnetization and demagnetization of the magnet $a^7$, causes the motor-bar $a$, to be reciprocated back and forth or vibrated, whereby the shaft $a^4$, is revolved with an intermittent or step-by-step motion and is locked to place at the completion of each step. The circuit through the coils of the magnet $a^7$, may be made and broken by the employment of a great number of different types of circuit breakers and their complemental connections, for example, by means of an automatic circuit breaker actuated by the shaft $a^4$, as will be hereinafter more fully described.

The construction and mode of operation of the motor-bar illustrated in Figs. 5 to 8 inclusive, are as above described with reference to Figs. 1 and 2, with the following exceptions: The guides $a^2$, are dispensed with and the edges of the slotted portion of the motor-bar $a$, are permitted to ride between the ratchet and escape-wheels and in contact with the shaft $a^4$, whereby the motor-bar $a$, is guided, and the forms of the detents, stop-dogs or pallets and of the teeth of the escape-wheel $a^{13}$, are slightly changed without substantially affecting their mode of operation.

Referring now more particularly to Fig. 9, a description will be given of an arrangement of circuits adapted to synchronously operate a pair of the hereinabove described motors in such manner that the same may be simultaneously arrested.

$b$, is a local battery of which the circuit passes by a conductor 1, to the coils of the motor magnet $a^7$, and then divides into two branches. One of these branches passes by a conductor 2, to one contact spring $c$, of a local circuit breaker and closer C, mounted on the shaft $a^4$, thence by a conductor 3, from the other contact spring $c'$, of the circuit breaker and closer C to a normally open key or series of keys $d$, and thence back to the battery $b$, by a conductor 4. The other branch of this local circuit passes by a conductor 5, to the spring controlled armature lever $e$, of a relay magnet E, when energized, thence through the front stop of said relay magnet and by a conductor 6, to the battery $b$. The line circuit 7, is divided at a manual switch $f$, and one branch of this circuit passes by a conductor 8, through the coils of the relay-magnet E, and thence by a conductor 9, through a line battery $g$, to earth at the receiver. The other branch of the line circuit 7 passes by a conductor 10, to one of the contact springs $h$, of a line circuit breaker and closer H, mounted on the shaft $a^4$, thence by the other contact spring $h'$, of the line circuit breaker and closer H and a conductor 11, through a line battery $i$, to earth at the transmitter.

The mode of operation of the hereinabove described circuits will now be described, and in this connection it will be assumed that the instrument illustrated at the right hand side of Fig. 9, is arranged as a transmitter and that the instrument illustrated at the left hand side of said figure is arranged as a receiver. The arrangements or adjustments of the instruments, whereby they are adapted to operate as transmitters or receivers, are accomplished by shifting the switch $f$, into position for closing the circuit through the contact-springs of the line circuit breaker and closer H, at the transmitting instrument and into position for closing the circuit through the coils of the relay E, at the receiving instrument, so that each instrument will operate as a transmitter or receiver according as its switch $f$, is turned into one or the other of the hereinabove described positions. When the normally open key $d$, is depressed at the transmitting instrument, the local circuit 1, 2, 3 and 4, is closed through the local circuit breaker and closer C, and the motor-magnet $a^7$, is energized and thus shifts the motor-bar $a$, against the force of the spring $a^{14}$, with the result that both the line and local circuit breakers and closers H and C, are advanced one step. This movement of the local circuit breaker and closer C, causes the contact spring $c$, to engage an insulating point $c^2$, and thus breaks the local circuit, whereupon the motor-bar $a$, moving under the influence of the spring $a^{14}$, causes the local circuit breaker and closer C, to be shifted into position for again making the local circuit, and the repetition of the above operations causes the shaft $a^4$, of the transmitter, to be revolved with a step-by-step motion as long as the key $d$, is in a depressed position. The line circuit breaker and closer H, closes the line circuit, whenever the local circuit breaker and closer C, interrupts the local circuit, and breaks the line circuit, whenever the local circuit breaker and closer C, closes the local-circuit. Whenever the local circuit is broken at the transmitter, the line-circuit is closed through the relay E, at the receiver, thus causing the local circuit to be closed at the receiver through the front stop of the relay, but not through the local circuit maker and closer, because the key $d$, at the receiver occupies its normal or open position. The closed local circuit 1, 5 and 6 at the receiver causes the motor-magnet $a^7$, thereat to be energized, whereby the motor-bar $a$, of the receiver is shifted into the same position as the motor-bar $a$, at the transmitter. Similarly the local circuit at the receiver is broken when the local circuit at the transmitter is closed, so that both motors are operated synchronously. As soon as the key $d$, at the transmitter, is released the local circuit at the transmitter is broken, whereby both instruments are simultaneously arrested.

It will be obvious to those skilled in the art to which our invention appertains that modifications may be made in details, for example, a series of keys and their complemental sunflower devices may be employed, instead of the single key illustrated in the drawings, or a central station actuated by one of the hereinabove described motors may be interposed in the line circuit or the disposition and arrangement of the conductors comprising the circuits may be modified or an electro-magnetic device interposed in a local or other circuit may be employed in lieu of the retracting spring $s'$, for controlling the armature lever $a^5$, of the motor-magnet $a^7$, without departing from the spirit of our invention. Hence we do not limit ourselves to the precise construction and arrangement hereinbefore explained and illustrated in the drawings.

Having thus described the nature and objects of our invention, what we claim as new, and desire to secure by Letters Patent, is—

1. A step by step electric motor comprising a longitudinally movable bar responding to electrical impulses in line and provided with pawl-and-ratchet connections for imparting a step by step motion to a revoluble member and with detent or pallet-and-escapement connections for equalizing said step by step motion, and a circuit breaker and closer mounted on said revoluble member and adapted to control the impulses in line, substantially as and for the purposes set forth.

2. A step by step motor comprising a shaft provided with ratchet and escape-wheels, a bar slotted for the accommodation of said shaft and provided at the sides of said slot with spring controlled pivotal pawls engaging said ratchet-wheel and at the ends of said slot with fixed detents or pallets for engaging said escape-wheel, an electro-magnet and circuit connections for operating said bar, and a circuit breaker and closer mounted on said shaft and adapted to control the impulses through the coils of said magnets, substantially as and for the purposes set forth.

3. In a step by step electric motor, a revoluble shaft provided with ratchet and escape-wheels, a bar slotted for the accommodation of said shaft and provided at the sides of said slot with pawls engaging said ratchet-wheel and at the ends of said slot with detents or pallets for engaging said escape-wheel, guides for said bar, an electro-magnet and circuit connections for said bar, and a circuit breaker and closer mounted on said shaft and adapted to control the impulses through the coils of said magnet, substantially as and for the purposes set forth.

4. A step by step electric motor comprising a bar connected with the armature of an electro-magnet and provided with pawl-and-ratchet connections for imparting a step by step motion to a revoluble member and with pallet and escapement connections for equalizing the steps of the motion of said member, and a circuit breaker and closer mounted on said revoluble member and adapted to make and break the circuit through the coils of said electro-magnet, substantially as and for the purposes set forth.

5. A step by step electric motor comprising a revoluble member, a bar connected with the armature of an electro-magnet and provided with pawl-and-ratchet and pallet and escapement connections for actuating said revoluble-member, a circuit breaker and closer mounted on said revoluble member and adapted to break the circuit through the coils of said magnet after its armature is pulled up, and a spring for shifting said bar to bring the circuit breaker and closer into position for making the circuit through the coils of said magnet, substantially as and for the purposes set forth.

6. A step by step electric motor comprising a revoluble member, an electro magnet having a spring controlled armature lever, a bar connected with said armature lever by a link, pawl-and-ratchet and pallet and escapement connections interposed between said bar and revoluble member, and a circuit breaker and closer mounted upon said revoluble member and adapted to control the circuit of said magnet, substantially as and for the purposes set forth.

7. A step by step electric motor comprising a revoluble member provided with ratchet and escapement wheels, a motor bar slotted for the accommodation of said shaft and provided at the sides of said slot with pawls engaging said ratchet-wheel and at the ends of said slot with pallets engaging said escapement wheel, an electro-magnet for operating said bar and a circuit breaker and closer mounted on said revoluble member and adapted to control the circuit of said electro-magnet, substantially as and for the purposes set forth.

8. A step by step electric-motor, comprising a slotted bar responding to electrical impulses in line and provided with pawl and ratchet connections for imparting a step by step motion to a revoluble member located in the slotted portion of the bar and with pallet-and-escapement connections for equalizing said step by step motion and a circuit breaker and closer mounted on the revoluble member and adapted to control the impulses in line, substantially as and for the purposes set forth.

9. In a system of electrical transmission, a series of step by step electric motors provided respectively with a vibratory bar responding to electrical impulses in line and having pawl-and-ratchet connections for imparting a step by step movement to a revoluble member and having pallet-and-escapement connections for limiting the step by step motion of the revoluble member, and mechanical and electrical devices for positively actuating one of said revoluble members and for causing the same to synchronously operate the other motors, substantially as and for the purposes set forth.

10. In a system of electrical transmission, two stations provided respectively with electro-magnets adapted to operate bars provided with pawl-and-ratchet and pallet-and-escapement connections for intermittently rotating a shaft, a relay magnet, local circuits controlled by a key and adapted to be closed through the stops of said relay and through the contacts of a local circuit breaker and closer mounted on said shaft, and a line circuit adapted to be closed by manual keys at each station through the coils of said relays and through the contacts of a line circuit breaker and closer on said shaft, the construction and arrangement being such that the shaft at the transmitting station is rotated by the depression of the key and consequent closing of the local circuit through its circuit breaker and closer and the shaft at the receiving station is rotated by the closing of its local circuit by the relay.

11. In a system of electrical transmission, a motor comprising a shaft, an electro-magnet, a bar, pawl-and-ratchet and pallet and escapement connections between said bar and the spring controlled armature lever of said magnet, a local battery circuit adapted to be closed by a manual key through a local circuit breaker and closer, and a circuit breaker and closer adapted to transmit electrical impulses to line, substantially as and for the purposes set forth.

12. In a system of electrical transmission, a motor comprising a shaft, an electro-magnet, a bar, pawl-and-ratchet and pallet and escapement connections between said bar and the spring controlled armature lever of said magnet, a local battery circuit adapted to be closed through said magnet, and a relay controlling said local battery circuit and responding to impulses in a line battery circuit, substantially as and for the purposes set forth.

13. In a system of electrical transmission, a transmitting station provided with an electro magnet, a shaft, a bar, pawl-and-ratchet and pallet and escapement connections between said bar and the spring controlled armature lever of said magnet, a local battery circuit adapted to be closed by a manual key through a local circuit breaker and closer, and a circuit breaker and closer adapted to transmit electrical impulses through a line battery circuit, and a receiving station provided with a shaft, an electro-magnet, a bar, pawl-and-ratchet and pallet-and-escapement connections between said bar and the spring controlled armature lever of said magnet, a local battery circuit adapted to be closed through said magnet, and a relay controlling said local battery circuit and responding to impulses in the line battery circuit, substantially as and for the purposes set forth.

In testimony whereof we have hereunto set our signatures in the presence of two subscribing witnesses.

JOB A. DAVIS.
ROBERT A. FOWDEN.

Witnesses:
THOMAS M. SMITH,
RICHARD C. MAXWELL.